J. B. McGINLEY.
OUTLET BOX.
APPLICATION FILED JUNE 23, 1911.
1,131,399.
Patented Mar. 9, 1915.
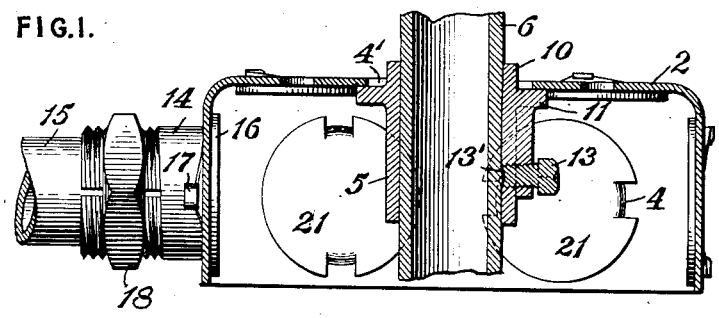
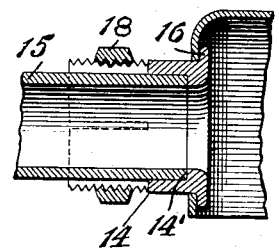
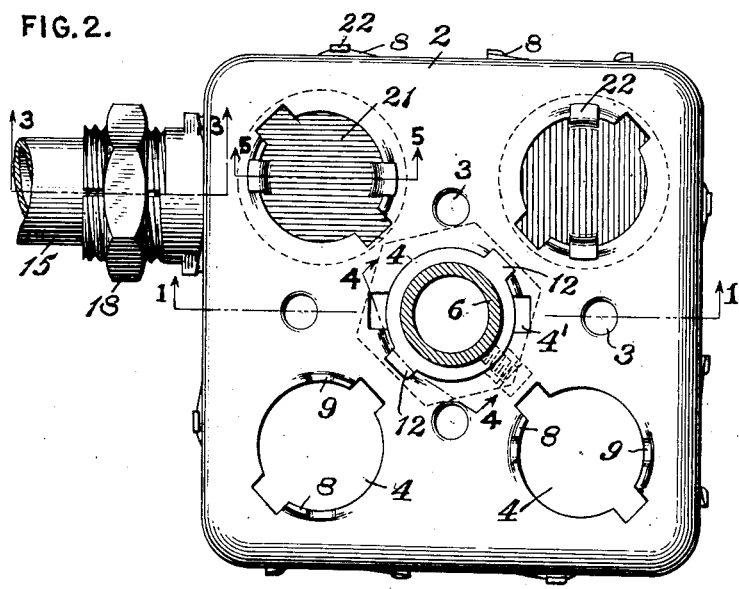
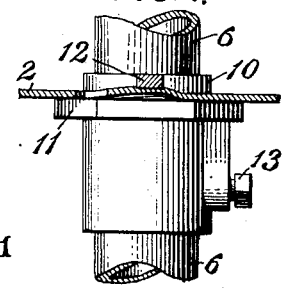
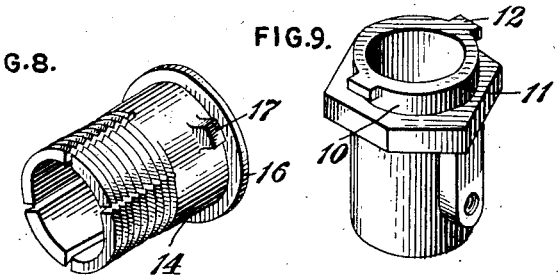
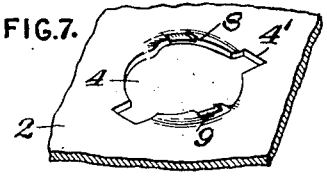
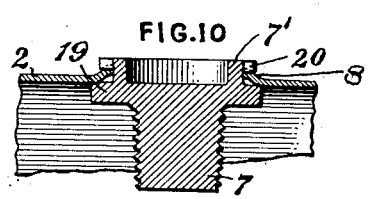
WITNESSES
INVENTOR

UNITED STATES PATENT OFFICE.

JAMES B. McGINLEY, OF PITTSBURGH, PENNSYLVANIA, ASSIGNOR TO HANDY MANUFACTURING COMPANY, OF PITTSBURGH, PENNSYLVANIA, A CORPORATION OF DELAWARE.

OUTLET-BOX.

1,131,399.  Specification of Letters Patent.  Patented Mar. 9, 1915.

Application filed June 23, 1911. Serial No. 634,863.

*To all whom it may concern:*

Be it known that I, JAMES B. McGINLEY, a resident of Pittsburgh, in the county of Allegheny and State of Pennsylvania, have invented certain new and useful Improvements in Outlet-Boxes, of which the following is a specification.

The primary object of this invention is to provide a simple and highly efficient mechanical and electrical connection between a bonding clamp, conduit bushing, fixture stud, or other coupling device and the outlet box to which such coupling is applied, the construction being such that a surface wedging action is set up, preferably at at least two points, which operates to cut through any enamel, paint, rust or other foreign substance on the surfaces of the connecting parts, bringing the metal of the parts in direct and positive contact in such manner as to provide a thoroughly efficient electrical union. The particular form of coupling is not of essence of the invention for, as above indicated, the same may be variously embodied.

A further purpose is to provide an effective cover for each of the several openings formed through the box which is securely held in place and which may be readily removed whenever the opening is required, the cover being preferably in the form of a disk or plate which engages one surface of the box with lugs projecting through the opening and having wedging engagement with the opposite surface. In the preferred adaptation, the box is formed of plate metal, and the wedging surfaces are formed by upsetting or pressing the metal adjacent the opening, with these upset portions operating to wedge and hold the cover in place when the opening is not in use, and to similarly hold the coupling when the latter is applied.

In the accompanying drawings, Figure 1 is a sectional elevation of a box constructed in accordance with the invention, the view being taken on line 1—1 of Fig. 2, and with the box shown connected by a bonding clamp to a gas pipe. Fig. 2 is an exterior elevation of the box, with covers applied to some of the openings and removed from others. Fig. 3 is a section through a conduit bushing and box, taken on line 3—3 of Fig. 2. Fig. 4 is a sectional elevation of the bonding clamp and box, taken on line 4—4 of Fig. 2. Figs. 5 and 6 are details of the cover for the coupling openings, and Fig. 7 is a view in perspective of a portion of a wall of the box, showing the formation of the coupling opening. Fig. 8 is a detail of the conduit bushing, and Fig. 9 is a similar view of the bonding clamp. Fig. 10 is a sectional elevation of a stud-like coupling used for connecting an electrical fixture.

Referring to the drawings, the plate metal outlet box 2 is of conventional form, being provided with usual screw openings 3 for fastening to a joist, studding or other wall or ceiling part. The back of the box and its side walls are formed with a plurality of coupling openings 4, one of these openings being preferably arranged through the center of the back to receive a bonding clamp 5, as in Figs 1, 2 and 4, for use in connection with a gas pipe 6, or to receive a threaded stud 7, Fig. 10, for supporting an electrical fixture, though it will be understood that the bonding clamp, also the fixture stud, may be applied to any other opening in the box, either at the back or through one of the sides.

The arrangement is preferably such that the coupling, regardless of its form, is inserted through the inside of the box, and with one exception the coupling may be fastened in place by manipulating it within the box. The portion of the coupling which extends through opening 4 is preferably circular in cross-section, and each of openings 4 is also circular, with opposite offsets or enlargements 4′, and with opposite edges of the opening bent, pressed, or upset to form the inclined surfaces 8 which terminate in the shallow notches or seats 9. All of the coupling openings in the box are adapted to receive interchangeably the several coupling devices to which reference has been made. Inasmuch as the inclined or wedge surfaces 8 are formed by being bent, pressed, or upset, it will be readily understood that these surfaces are yieldable toward the plane from which they were bent, pressed, or upset.

Bonding clamp 5 is in the form of a sleeve or socket having a neck portion 10 which projects through the box opening, the sleeve being flanged at 11 to bear against the inner surface of the box, with said flange surfaced to form wrench holds as shown. Projecting from opposite sides of neck 10 are lugs 12 which are spaced sufficiently from flange 11 to accommodate the thickness of the metal of the box and to ride up on and tightly wedge against offsets 8 when the sleeve or clamp is turned home, lugs 12 being brought into register with notches or seats 9 with which they form sufficient engagement to hold the clamp securely in place, preventing it from turning backward and loosening. By thus wedging the parts together by a sweeping movement of one over the other which has the effect of scraping or cutting from the surface any enamel, paint, rust or grease lodged thereon a positive and permanent electrical as well as mechanical connection is formed which adds greatly to the efficiency of the box and coupling. The bonding clamp may be variously secured to the gas pipe 6, in the present adaptation binding screw 13 being shown which is preferably recessed at its inner extremity to form a peripheral edge which bites into the pipe when the screw is set, as indicated at 13', Fig. 1.

The coupling or bushing 14 for the conduit 15 may be of the split form shown, with its inner end formed with the headed flange 16 which engages the inner surface of the box, and with lugs 17, like lugs 12, spaced from flange 16 sufficiently to wedge upon the inclined surfaces 8. Bushing 14 is shouldered internally at 14' to receive the extremity of the conduit and to provide a smooth surface or runway for the wires. While the conduit may be fastened within the bushing in any suitable manner, the split form of the latter in connection with clamp nut 18 provides for securely connecting said parts. The end formation of the coupling stud 7 is substantially the same as that of the bonding clamp 5, the stud being flanged at 19 to engage the inner surface of the box, and neck 7' provided with lugs 20 which coöperate with the inclined surfaces 8, as heretofore described.

Each of the several openings 4 when not in use may be conveniently closed by a disk-like plate or cover 21 which is slightly larger than the opening and is adapted to bear against the inner surface of the box wall, hook-like lugs 22 being struck up from cuts in the disk and adapted to enter the opening 4 and wedge upon the inclined surfaces 8 when the disk is turned and thereby maintaining the necessary hold which prevents the cover from dropping from position. At the same time, the cover may be readily removed when the opening is required. The lugs of the cover, also the lugs of the coupling members, may be engaged by a wrench or other tool for either fastening or loosening the parts, as will be understood.

As will be seen, the opposing surfaces of the coupling members which coöperate with the box in being secured together, extend in substantially parallel planes, permitting the construction of the coupling devices to be made in a simple manner and without requiring any particular care in providing for an absoluteness with respect to the distance between these faces, such as would be required if the faces were to operate in connection with a member having a wall thickness extending in the same plane throughout the travel of the coupling. Inasmuch as the notches or seats 9 form the resting places for the lugs of the coupling, after the lugs have traversed the faces 8, while said faces 8 are yieldable toward the plane of the box wall, it will be readily understood that the final seating of the coupling lugs within the notches or seats 9 practically provides a positioning of the coupling against endwise movement, while the bent faces 8 project into the clearance between the opposing faces of the lugs and annulus of the coupling member, and thus forms a barrier against accidental return movement of the coupling member.

It is characteristic of the several coupling devices and the hole covers that they are applied and manipulated from within the box, all of said devices being so arranged that they are fastened by such internal manipulation with the exception of the conduit bushing to the projecting portion of which it may be necessary to apply a wrench. But as the conduit clamping means is manipulated at the outside of the box, no inconvenience results.

I claim:—

1. The combination of a sheet metal outlet box having an opening, the metal being bent adjacent the opening to form yieldable wedging surfaces, a coupling adapted to engage the surface of the box opposite the wedging surfaces and provided with a neck which projects through the opening, and lugs on the neck which engage and wedge against the wedging surfaces when the coupling is turned.

2. The combination of a sheet metal outlet box having a circular opening formed with offsets, the metal of the box adjacent the opening being bent to form yieldable wedging surfaces on one face of the box concentric to a wall of the opening, and a circular coupling extending through the opening and flanged to engage a surface of the box, said coupling having lugs spaced from the coupling flange and adapted to enter the opening offsets and overhang the surface of the box adjacent the wedging portions and engage said portions during turning movement of the coupling to its engaging position.

3. A sheet metal outlet box having openings formed through the walls thereof and the openings formed with offsets, the metal of the walls adjacent to the openings being bent to form yieldable wedging surfaces which lead from the opening offsets, in combination with covers having hook-like lugs struck up therefrom which are adapted to enter the opening offsets and engage the wedging surfaces when the covers are rotated.

4. The combination of an outlet box formed of sheet metal and having coupling openings, the metal adjacent the openings bent to form wedging surfaces, a coupling extending through one of the openings, a shoulder on the coupling adapted to engage one face of the box, and lugs projecting from the coupling and spaced from said shoulder a distance greater than the thickness of the metal of the box and adapted upon turning the coupling to frictionally engage said wedging surfaces and exert pressure thereon in the direction of the coupling shoulder, said wedging surfaces being free to move in the direction of pressure application during the lug engagement therewith.

5. An outlet box formed of sheet metal with openings through the box walls, the metal of the walls being bent outwardly adjacent the openings to form outwardly extending wedging projections on the exterior faces of the walls, said projections terminating in seats, a coupling within and adapted to engage the inner surface of the box and having a portion extending through one of said openings, and lugs on the extended portion of the coupling adapted when the coupling is turned to extend over and bear against the wedging projections on the outer surface of the box, said wedging projections being free to move in the direction of pressure application during the lug engagement therewith.

6. An outlet box formed of sheet metal with openings through the walls of the box, the openings formed with offsets and the metal adjacent the offsets bent in wedge form with each of said wedge-shaped bends tapering toward one of the opening offsets, a coupling adapted to engage the surface of the box opposite said bends and having a portion extending through one of the openings, lugs on said extended portion adapted to pass through the opening offsets and move onto said tapered wedge-like bends when the coupling is turned, said bends being free to move in the direction of pressure application during the lug engagement therewith.

In testimony whereof I affix my signature in presence of two witnesses.

JAMES B. McGINLEY.

Witnesses:
J. M. Nesbit,
F. E. Gaither.